Figure 1:
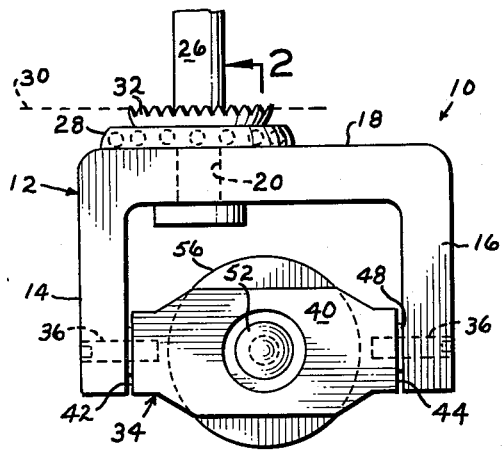

Aug. 15, 1961  A. J. MULLIKIN  2,995,771
GIMBALED CASTER

Filed May 11, 1959  2 Sheets-Sheet 1

ARTHUR J. MULLIKIN
INVENTOR.

BY
ATTORNEY

Aug. 15, 1961        A. J. MULLIKIN        2,995,771
GIMBALED CASTER

Filed May 11, 1959        2 Sheets-Sheet 2

ARTHUR J. MULLIKIN
*INVENTOR.*

BY
ATTORNEY

United States Patent Office 2,995,771
Patented Aug. 15, 1961

2,995,771
GIMBALED CASTER
Arthur J. Mullikin, Oklahoma City, Okla.
(3001 E. Osie, Wichita, Kans.)
Filed May 11, 1959, Ser. No. 812,241
5 Claims. (Cl. 16—21)

The present invention relates generally to casters for supporting selected articles in a mobile manner.

The present invention is a continuation-in-part of an application filed by me in the United States Patent Office on March 18, 1959, under Serial Number 800,333.

The prior art reveals a large number of casters of varied designs of the swivel and locking type for fixing the position of the article supported. However, those casters providing a locking means or arrangement for supporting wheels do not, as far as I have been able to learn, provide a means for increasing the support area at the point of contact of the supporting wheel with a supporting surface. The use of casters for supporting heavy articles results in an indentation or recess being formed on the surface of the supporting area because of the relatively small supporting area at the point where the wheel contacts the supporting surface. This is particularly true where the supporting surface comprises a floor with a covering such as linoleum, rugs, or the like.

It is, therefore, the principal object of the instant invention to provide a caster equipped with wheel means including a wheel holding frame which will support a desired article in a mobile manner, and, wherein the wheel holding frame may be manually rotated about an axis, perpendicular to the axis of rotation of the wheels, for positioning one side surface of the wheel holding frame in contact with a supporting surface.

Another object is to provide a caster of this class having bracket means which may be pivotally connected to the lower surface of an article to be supported on a vertical axis off-set with respect to the points of contact of the supporting wheels with the support surface, whereby the caster will pivot rearwardly in a trailing manner when the supported article is moved across the support surface.

Another object is to provide a dual wheeled type caster wherein the axle common to both wheels is free to pivot about a horizontal axis perpendicular to the wheel axis whereby the wheels may tilt or pivot laterally when rolling across rough or uneven surfaces when moving a supported article.

Another object is to provide a wheeled caster of this class having a frame-like wheel supporting a cross-member wherein the spacing between the horizontal axis of the cross-member and the outer surface of its respective sides is equal to the distance between the horizontal axis and the wheel supporting surface thus permitting the cross-member to be rotated 90° in either direction for positioning a lateral outer side surface of the cross-member in contact with a supporting surface without changing or altering the height of the caster thereby increasing its supporting stability.

Still another object is to provide a caster of this class wherein a wheel supporting cross-member is centrally journaled on a horizontal axis, and wherein the wheel is journaled by an axle having its axis off-set upwardly with respect to the axis of the wheel supporting cross-member for lowering the center of gravity of the supported article.

Yet another object is to provide a caster of this class wherein the supporting wheel, or wheels, may be manually rotated about a horizontal axis, perpendicular to the axis of the wheel, for positioning the caster in a fixed position and which includes means for returning the caster wheels toward a rolling position when the weight of the supported article is removed from the caster.

The present invention accomplishes these and other objects by providing a substantially inverted U-shaped bracket, or yoke, which includes a rectangular surface adapted to be connected to a vertical spindle or shaft for pivoting movement of the yoke about the vertical axis of the shaft. The yoke includes a pair of depending, spaced-apart, parallel arms which journal a frame-like cross-member therebetween on a horizontal axis. One or more wheels are journaled within the frame on an axle perpendicular with respect to the horizontal axis of the frame.

Figure 2:
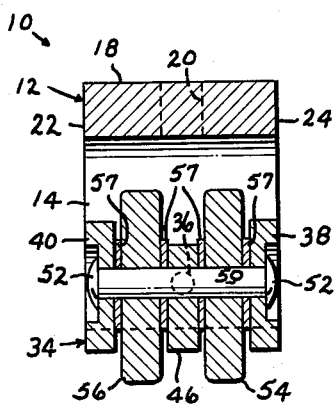
Figure 3:
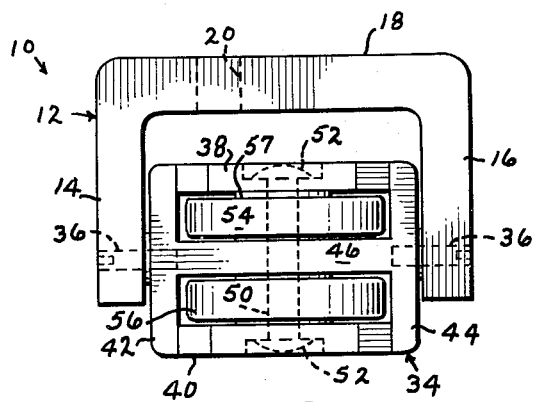
Figure 4:
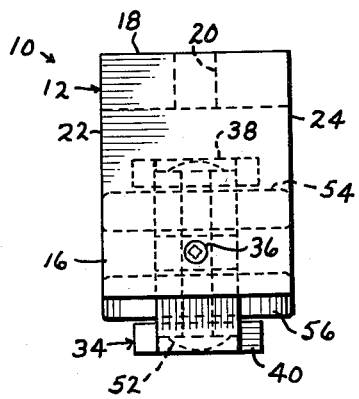
Figure 5:
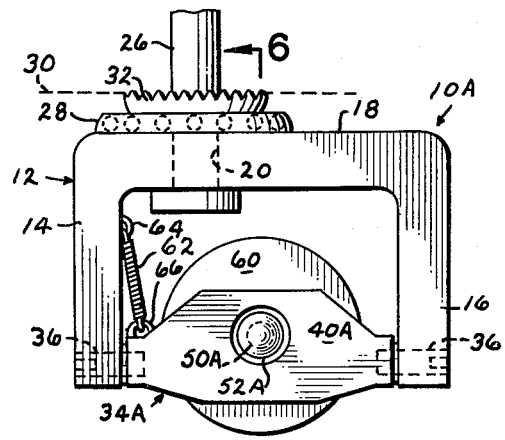
Figure 6:
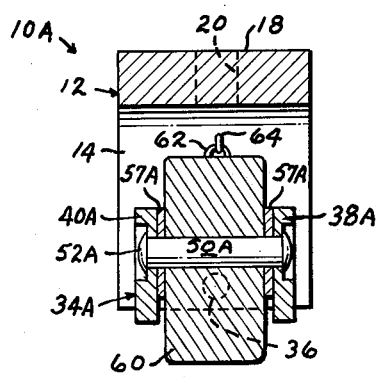
Figure 7:
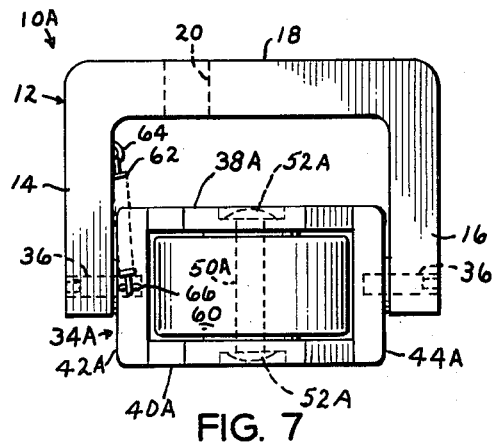
Figure 8:
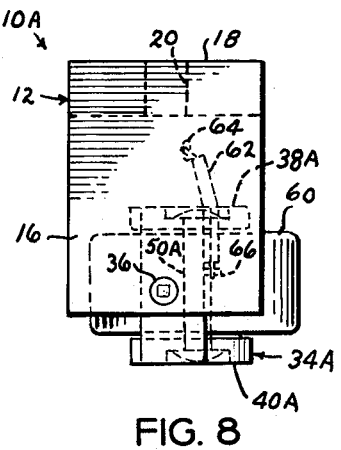

Other objects will be apparent from the following description when taken in conjunction with the accompanying two sheets of drawings, wherein:

FIGURE 1 is an elevational view of the device;
FIGURE 2 is a vertical cross-sectional view taken substantially along line 2—2 of FIG. 1;
FIGURE 3 is an elevational view of the device with the cross-member and wheels rotated substantially 90 degrees about its horizontal axis;
FIGURE 4 is an end elevational view of the device in the position illustrated in FIG. 3;
FIGURE 5 is an elevational view of an alternate embodiment of the device;
FIGURE 6 is a vertical cross-sectional view taken substantially along the line 6—6 of FIG. 5;
FIGURE 7 is an elevational view of the alternate embodiment of the device with the wheel supporting bracket and wheel rotated substantially 90 degrees about its horizontal axis; and,
FIGURE 8 is an end elevational view of the device in the position illustrated by FIG. 7.

Like characters of reference designate like parts in those figures of the drawings in which they occur.

In the drawings:
Referring more particularly to FIGS. 1 to 4, inclusive, the reference numeral 10 indicates the device, as a whole, including an inverted U-shaped member 12, rectangular in cross-section, having depending legs 14 and 16. The bight portion 18, of the U-shaped member is provided with a bore or aperture 20, centrally disposed between its opposing sides 22 and 24, and adjacent the leg 14 for receiving a spindle or shaft 26 which in turn carries annular bearing means 28 in contact with the upper surface of the bight portion 18. The shaft 26 is adapted to enter a vertical downwardly open bore or recess in the lower surface 30 of an article to be supported in a mobile manner. A contact or friction plate 32 is interposed between the bearing 28 and the surface 30 thus permitting pivotal rotation of the yoke or U-shaped member 12 about the vertical axis of the shaft 26.

Obviously the bearing 28 acts to support the weight carried by the member 12 and permits greater ease of rotation of the member 12. It is to be understood that the shaft 26 and bearing 28 arrangement is by way of example only since it seems readily apparent that the member 12 may be connected to an article to be supported in any number of more or less conventional ways. In some instances, for example, it might be desirable to rigidly secure the member 12 to the lowermost surface of the supported article as by bolt and nut means, not shown, extending through the aperture 20.

A rectangular frame-like cross-member 34 extends horizontally and is freely received between the lower end portions of the legs 14 and 16. The cross-member 34 is pivotally connected at each end 42 and 44, respectively, for rotation about a horizontal axis formed by a pair of screws 36 threadedly secured within suitable threaded bores formed medially the transverse width of the respective end portions of the legs 14 and 16. The inwardly disposed end portions of each of the set screws 36 are co-operatingly received by suitable aligned bores formed in the opposing ends 42 and 44 of the frame-like cross-member 34. As illustrated in FIG. 1 the opposing longitudinal side members 38 and 40 of the cross-member 34 are enlarged to extend upwardly of and below the planes defining the upper and lower surfaces of the cross-member ends 42 and 44 to increase the lateral outwardly disposed flat surface or face of the respective cross-member sides 38 and 40 for the purposes which will readily be apparent. The cross-member 34 is centrally divided longitudinally by a partition 46 rigidly connected with the cross-member ends 42 and 44. Washers or bushings 48 are preferably interposed between the respective ends of the cross-member around the screws 36.

An axle 50 extends transversely through the cross-member sides 38 and 40 and partition 46. The opposing ends 52 of the axle are countersunk to lie upwardly of the respective outer surface of the cross-member sides 38 and 40.

A pair of wheels 54 and 56 having a radius greater than the spacing between the axle 50 and the respective upper or lower edge surfaces of the frame sides, as viewed in FIG. 1, are journaled by the axle 50 within the cross-member frame on opposing sides of the partition 46. It is important that the radius of the wheels be equal to the spacing between the horizontal axis of the cross-member 34 and the outer surface of the respective sides 38 and 40. The length of the yoke legs 14 and 16 must be such that the cross-member 34 and wheels 54 and 56 may freely pivot about the horizontal axis of the cross-member without contact between the wheels and the inner surface of the bight portion 18. Spacing washers 57 carried by the axle 50 are placed on each side of the respective wheels. Thus, the caster 10 will support an article of furniture, or the like, in a mobile manner. When the supported article is positioned where desired, the supported article is manually lifted to remove the weight from the caster and the frame-like cross-member 34 is manually rotated about its horizontal axis substantially 90° to position either side 38 or 40 of the cross-member in contact with the supporting surface (FIGS. 3 and 4). Since the area of the cross-member sides 38 or 40 contacting the supporting surface is substantially greater than the point contacts of the respective wheels, when in supporting position, less damage will be done to a supporting surface than would be done if only the wheels 54 and 56 were supporting the article. Furthermore, since the area of contact is substantially greater, by reason of the area of the sides 38 and 40, the coefficient of sliding friction between the caster and the supporting surface is greatly increased thus providing additional stability to the supported article. The use of the dual wheels 54 and 56 distributes the weight of the supported article over a larger area of the supporting surface and increases the stability of the caster against unauthorized tipping or rotation of the cross-member 34 about its horizontal axis when the caster is supporting an article in a mobile manner.

Referring now more particularly to FIGS. 5 to 8, inclusive, a modified form of the caster is illustrated and is designated generally by the numeral 10A. The caster 10A is identical in construction with respect to the caster 10 except for the construction of the frame-like cross-member 34A and wheel means 60. The frame-like cross-member 34A is rectangular in general configuration having opposing longitudinal sides 38A and 40A and end members 42A and 44A. The end members 42A and 44A are similarly journaled between the yoke legs 14 and 16 by the screws 36 to provide a horizontal axis for the cross-member 34A. The respective sides 38A and 40A of the cross-member are similarly enlarged to define a respective outer surface substantially greater than that of the end members 42A and 44A but in this instance are each extended upwardly a greater distance in off-set relation with respect to the horizontal axis of the cross-member, as viewed in FIGS. 5 and 6.

An axle 50A is similarly extended transversely through the frame and has its respective ends 52A similarly countersunk within the respective outer surfaces of the cross-member sides 38A and 40A. It will be noted from an examination of the drawings that the axle is extended through the cross-member sides 38A and 40A in upwardly off-set relation with respect to the horizontal axis of the cross-member, as viewed in FIGS. 5 and 6. This lowers the center of gravity of the caster and the article supported.

The wheel 60, journalled by the axle 50A, within the cross-member frame is preferably a wheel having a relatively wide or broad tread, as shown, for the purpose of distributing the load over a large area of the supporting surface. However a relatively narrow wheel may be used if desired. A washer 57A, carried by the axle 50A, is placed on each side of the wheel 60 within the frame 34. Obviously the radius of the wheel 60 must be greater than the distance between the axle 50A and the lower-most edge surface of the frame sides 38A and 40A, as viewed in FIGS. 5 and 6. It is similarly important that the distance between the horizontal axis of the cross-member 34A and the supporting surface be equal to the spacing between the horizontal axis of the cross-member 34A and the outer surfaces of its respective sides 38A and 40A so that either side of the cross-member may be placed in contact with the floor in article supporting relation without altering the height of the caster. Similarly the length of the yoke legs 14 and 16 must be such that the cross-member and wheel may freely pivot about the horizontal axis of the cross-member without contact between the wheel 60 and the inner surface of the bight portion 18. The operation and use of the caster 10A is identical to that described hereinabove for the caster 10 with the exception that resilient means, such as a spring 62, is employed to return the cross-member and wheel from a fixed article supporting position to a mobile position when the weight is lifted off of the caster. The spring 62 is connected at its respective ends to the upper inner surface of the yoke leg 14 and centrally to the upper edge surface of the frame end 42A as at 64 and 66, respectively. Thus, as is shown by the dotted lines in FIG. 8, when the caster cross-member is positioned in fixed supporting position, the spring 62 is under tension and will return the cross-member to the position shown by FIGS. 5 and 6 when the weight of the supported article is removed from the caster.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A combination caster and stationary support, comprising: a yoke having a bight portion and depending legs at the opposite ends of the bight portion; means for rotatably securing said bight portion to an article to be supported by the caster for turning movement of the yoke in a horizontal plane; a rectangular frame having interconnected side members and end members and being journaled at its opposite ends to said legs for turning movement about a horizontal axis; the outer faces of said side members being flat; and wheel means journaled by an intermediate portion of said frame for rotation about an axis extending at right angle to said horizontal axis, said wheel means and frame being of a size permitting movement betwen said legs and under the bight portion of said yoke between upright rolling, and horizontal, stationary supporting, positions upon rotation of said frame about said horizontal axis.

2. Structure as specified in claim 1, and means connected with said frame laterally of its horizontal axis for turning said wheel means to one of said positions.

3. Structure as specified in claim 1 in which the distance between the horizontal axis of said frame and the outer face of its respective sides is equal to the spacing between the horizontal axis and a supporting surface.

4. Structure as specified in claim 3, and means connected with said frame and extending laterally of its horizontal axis for rotating the axis of said wheel means to a horizontal position when the caster is lifted off of its supporting surface.

5. A combination caster and stationary support, comprising: a yoke having a bight portion defined by a flat horizontal upper surface and depending legs at the opposite ends of the bight portion; spindle means extending vertically through said bight portion for connecting the bight portion of said yoke to an article to be supported for turning movement of the bight portion in a horizontal plane; a rectangular frame having interconnected side members and end members and being journaled horizontally between the depending legs of the yoke; the outer faces of said side members being flat; an axle secured to said frame perpendicular to the horizontal axis of the latter; and wheel means journaled on the axle, the diameter of said wheel means being less than the spacing between the inner-surfaces of said legs and the distance between the horizontal axis of said cross-member and the undersurface of said bight portion.

References Cited in the file of this patent

UNITED STATES PATENTS

| | | |
|---|---|---|
| 314,955 | Mendenhall | Mar. 31, 1885 |
| 331,461 | Thompson | Dec. 1, 1885 |
| 962,308 | Burnett | June 21, 1910 |
| 1,106,853 | Smouse | Aug. 11, 1914 |
| 2,683,277 | Bernaerts | July 13, 1954 |

FOREIGN PATENTS

| | | |
|---|---|---|
| 14,066 | Great Britain | Dec. 18, 1913 |
| 26,753 | Great Britain | Dec. 19, 1898 |